(12) United States Patent
Kanayama

(10) Patent No.: US 8,068,935 B2
(45) Date of Patent: Nov. 29, 2011

(54) HUMAN-GUIDED MAPPING METHOD FOR MOBILE ROBOT

(76) Inventor: Yutaka Kanayama, Monterey, CA (US)

(*) Notice: Subject to any disclaimer, the term of this patent is extended or adjusted under 35 U.S.C. 154(b) by 541 days.

(21) Appl. No.: 12/085,719

(22) PCT Filed: Oct. 18, 2006

(86) PCT No.: PCT/US2006/040844
§ 371 (c)(1),
(2), (4) Date: May 28, 2008

(87) PCT Pub. No.: WO2008/048260
PCT Pub. Date: Apr. 24, 2008

(65) Prior Publication Data
US 2009/0198375 A1  Aug. 6, 2009

(51) Int. Cl.
G06F 19/00 (2011.01)

(52) U.S. Cl. ........ 700/245; 700/250; 700/253; 700/254; 700/259; 700/264; 382/103; 382/107; 382/153

(58) Field of Classification Search .................. None
See application file for complete search history.

(56) References Cited

U.S. PATENT DOCUMENTS

| | | | |
|---|---|---|---|
| 4,589,810 A * | 5/1986 | Heindl et al. ............ 414/5 |
| 4,816,998 A | 3/1989 | Ahlbom | |
| 4,821,192 A | 4/1989 | Taivalkoski et al. | |
| 5,109,340 A | 4/1992 | Kanayama | |
| 5,739,657 A | 4/1998 | Takayama et al. | |
| 6,009,359 A | 12/1999 | El-Hakim et al. | |
| 6,134,486 A | 10/2000 | Kanayama | |
| 6,285,920 B1 * | 9/2001 | McGee et al. ............ 700/254 |
| 6,314,341 B1 * | 11/2001 | Kanayama ............ 701/1 |
| 6,347,261 B1 * | 2/2002 | Sakaue et al. ............ 700/245 |
| 6,453,212 B1 * | 9/2002 | Asama et al. ............ 700/245 |
| 6,965,209 B2 | 11/2005 | Jones et al. | |
| 7,015,831 B2 * | 3/2006 | Karlsson et al. ............ 340/995.1 |
| 7,848,850 B2 * | 12/2010 | Hoshino et al. ............ 700/264 |
| 2003/0114959 A1 * | 6/2003 | Sakamoto et al. ............ 700/245 |
| 2003/0144763 A1 * | 7/2003 | Mori et al. ............ 700/245 |
| 2005/0041839 A1 * | 2/2005 | Saitou et al. ............ 382/103 |
| 2005/0256611 A1 * | 11/2005 | Pretlove et al. ............ 700/264 |
| 2006/0056678 A1 * | 3/2006 | Tanaka et al. ............ 382/153 |
| 2006/0140450 A1 * | 6/2006 | Hong et al. ............ 382/107 |
| 2006/0241792 A1 * | 10/2006 | Pretlove et al. ............ 700/83 |
| 2007/0022078 A1 * | 1/2007 | Gupta et al. ............ 706/59 |
| 2007/0233318 A1 * | 10/2007 | Lei ............ 700/245 |
| 2010/0222925 A1 * | 9/2010 | Anezaki ............ 700/253 |

* cited by examiner

Primary Examiner — Khoi Tran
Assistant Examiner — Jonathan Sample

(57) ABSTRACT

A method of mapping an operation area by a team of a human and a mobile robot 200 includes the steps of defining a graph representing the area by a human 201, guiding the robot by human along an edge 203, stopping at a vertex in the graph by the team 203, creating a vertex record if stopped at a new vertex 205, localizing the robot and vertices if stopped at an existing vertex 206, creating an edge record if finished a new edge 208, and outputting an area's map including a set of vertex records and a set of edge record by the robot 210. The robot's human-tracking step 203 includes the steps of obtaining a 2-DOF motion command from sensors that detect the human's action and executing a 2-DOF motion based on the motion command.

6 Claims, 13 Drawing Sheets

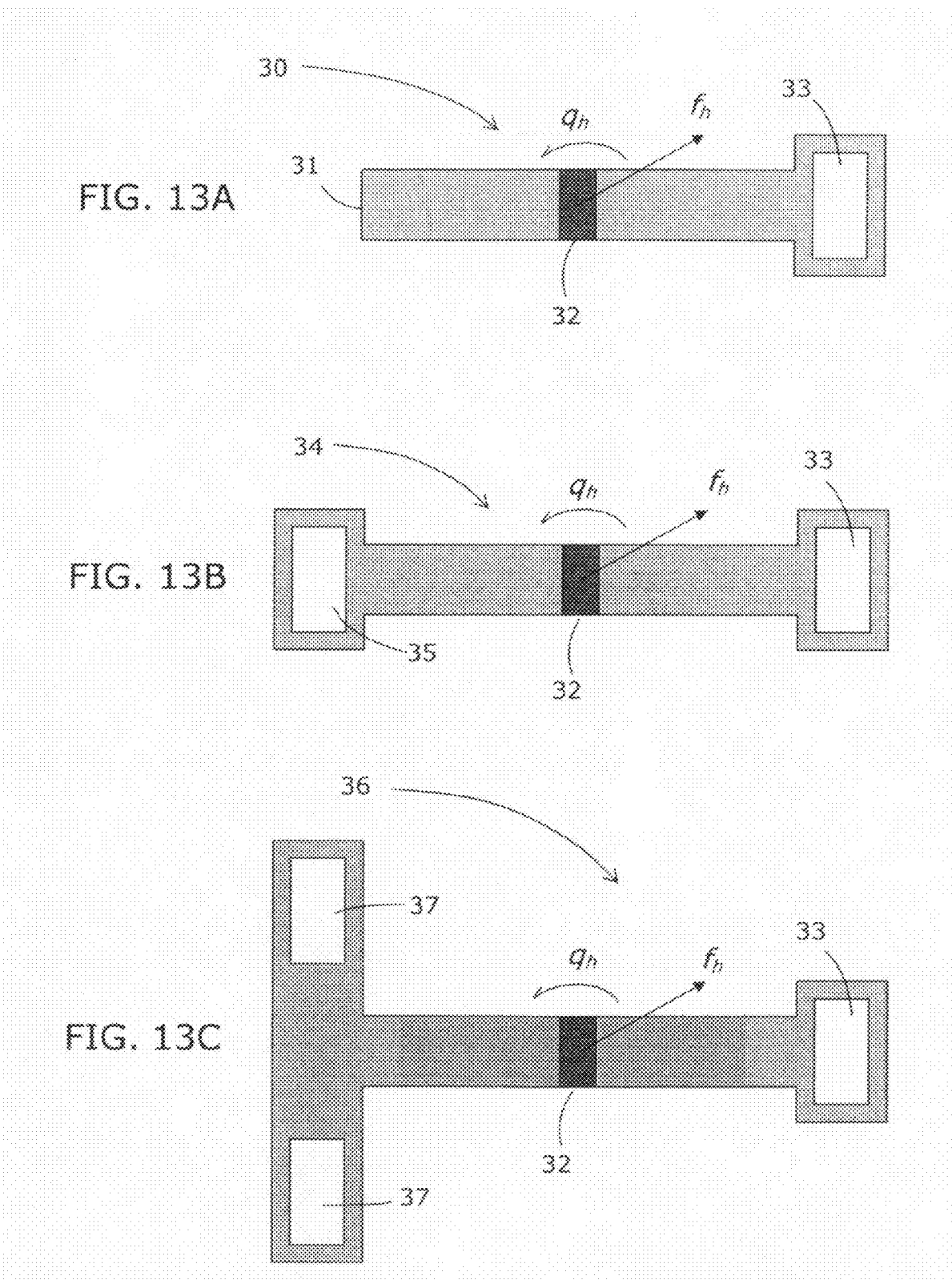

HUMAN-GUIDED MAPPING METHOD FOR MOBILE ROBOT

TECHNICAL FIELD

This invention is related to the problem of mapping an operation area for a mobile robot.

BACKGROUND ART

Mobile robots have gradually been deployed into our everyday lives. Entertainment robots, floor-cleaning robots, security guard robots, and others have been made commercially available. Human-type robots (humanoids) are demonstrating reliable running motion in research laboratories in Japan (for instance, a patent WO/2006/062948 discloses technology on a legged robot). Extensive attempts have been made to make those autonomous robots understand their surroundings.

Patents WO/2006/046053, WO/2006/046049, and WO/2006/046044 discuss methods of cleaning a flooring surface with a dedicated hardware system. However, they do not mention how the robot recognizes its surroundings.

Another patent WO/2005/092632 discloses a method for a mobile robot to navigate using two-dimensional barcodes which are formed at predetermined intervals on a floor. However, installing the extra-hardware on the floor is expensive and time-consuming for users.

Another patent WO/2005/098476 discloses a method for an autonomous mobile robot to estimate its position using optical emitters and optical sensors to detect their reflected light. However, the use of the light source makes the application of this robot expensive and limits its application possibilities.

Other patents WO/99/59042 and WO/2000/043186 disclose methods for a mobile robot to systematically cover an area by pasting boundary markers and by sensing the area edges. The use of special markers makes the system expensive and installation tedious, and limits its application areas.

Other patents WO/2005/081074, WO/2005/006098, and WO/1999/028800 disclose methods for a mobile robot to dock to a base station. This method helps the robot to understand the geometrical relations around the base station, but the robot's understanding of the whole operation area cannot be expected.

Another patent WO/2001/038945 discloses a method of mapping surroundings using multiple mobile robots. However, if there is a method using only one robot would be much more useful.

Another invention U.S. Pat. No. 6,009,359 describes methods of mobile mapping to generate a geometrically precise three-dimensional detailed model of an unknown indoor environment. However, how to avoid odometry errors on a mobile robot is not specifically described.

Still another invention U.S. Pat. No. 6,965,209 discloses a method for a robot to confine to a particular space by using a portable barrier signal transmitter. However, obviously, a method that does not use such a hardware piece is preferred.

Patent disclosures WO/88/004081 and U.S. Pat. No. 4,821,192, describe a mobile robot navigation method using a node map. The node map is pre-designed by a human and given to the robot as data. What advantages can be expected by using this node map in not clearly addressed.

Traditionally, the Simultaneous Localization And Mapping (SLAM) approach has been pursued in the robotics research community for the purpose of mapping an unknown operation area. In this approach, a self-contained autonomous mobile robot is supposed to explore and map unknown surroundings by itself.

A patent disclosure WO/2004/059900 describes a SLAM method using image sensors. Another patent WO/2001/078951 discloses a method for a mobile robot to find a semi-optimal path to a given goal in a wholly unknown, unpredictable and partly, dynamic large-scale environment. Another patent U.S. Pat. No. 7,015,831, describes methods of generating and updating a map with a visual sensor and the SLAM technology.

Limitations of the SLAM approach are as follows: (1) The precision of the map obtained is limited because of the mobile robot's poor odometry capability ("odometry" is the function of a mobile robot that estimates its own robot frame $((x, y), \theta)$ by accumulating the robot's incremental movement at each sampling time). (2) The robot loses its positional identification in a complex operation area because of odometry errors, and hence, autonomous mapping of a complex operation area becomes very difficult. (3) Furthermore, this approach lacks a fundamental consideration in the mapping problem: Depending on situations, a robot may have to deal with multiple operation areas in given surroundings. The robot is never able to know these distinct operation areas autonomously without humans' instruction.

An algorithm for a mobile robot to track a linear or circular path using the curvature is disclosed in U.S. Pat. No. 6,134,486. This algorithm is useful if $v \neq 0$, and hence, the curvature is defined. However, in this present invention, the condition $(v \neq 0)$ is not guaranteed. Therefore, the present invention does not adopt this prior invention.

An algorithm for recording a manually driven vehicle's motion is disclosed in a patent U.S. Pat. No. 6,314,341. In this prior patent, the robot's motion is generated by human's physical force while the motors' power is off. This motion-generation means is not useful enough in case the robot is too heavy for a human to move around.

DISCLOSURE OF INVENTION

The problem to be solved in the present patent is for a mobile robot to map of an operation area A. This problem is further divided into the following three sub-problems:

[Problem 1] How can the robot know the boundary of A?
[Problem 2] How can the robot know the internal geometrical features of A?
[Problem 3] How can the robot create the map of A?

Before describing the solution methods, we need to introduce definitions on (1) 2-DOF motion and 2-DOF motion command, and (2) graphs and maps.

Definitions on 2-DOF Motion and 2-DOF Motion Command: Consider a two-dimensional rigid body mobile robot 1 in a plane, where the global Cartesian frame (coordinate system) 2 is defined, as shown in FIG. 1. This robot has a "body direction" θ3 on its body. A "robot frame" $(X_R, Y_R)$ 4, is defined on the robot with its X-axis direction equal to the body direction θ. The robot's frame F is represented as $((x, y), \theta)$, where x4 and y5 are the position of its origin, and its direction θ3 in the global frame. On the other hand, robot's instantaneous motion can be described as $$M = (v, \mu, \omega),  \quad (\text{EQ. 1})$$

where v7 is the "translation speed," µ8 the "translation direction" in the robot frame, and $\omega = d\theta/dt$9 the "rotation speed" in the global frame, as shown in FIG. 1. The translation speed v and direction µ represent this body's translation motion. We stipulate that the translation direction $\mu$8 is normalized as $-\pi/2 < \mu \leq \pi/2$. If the translation speed $v<0$, it is understood that the robot is moving in a direction of $\mu+\pi$ at a speed of $|v|$. Legged robots generally possess this 3-DOF motion capacity. If a wheeled vehicle possesses this 3-DOF motion capability, it is called "omnidirectional."

If the robot's motion capacity is limited so that the translation direction is always equal to the robot's body direction $\theta$, or $\mu=0$, the motion described in (EQ. 1) becomes $$M=(v, 0, \omega) \qquad (EQ. 2)$$

Because this motion has only two variables, v and $\omega$, we call it a "two degrees of freedom" motion or "2-DOF" motion. The motion capacity of conventional vehicles, such as automobiles, bicycles, tricycles, and differential-drive vehicles is under this limitation. These vehicles cannot move sideways. When there is no ambiguity, a 2-DOF motion might be represented as $M=(v, \omega)$.

To map an operation area, a human guides a robot in the area. For that mission, the use of restricted 2-DOF motion is actually better than 3-DOF motion. The reasons are as follows: (1) The robot direction is aligned to the edge direction in the graph; hence, the sensors mounted on the left/right side of the robot can aim straight at side objects. This positioning of the robot is the best for the geometrical-feature-detection function. (2) The number of human-detecting sensors can be minimized because the robot always heads to the human. (3) In the human-tracking session, the robot turns to the human when the robot properly recognizes human. The human confirms that the robot is functioning appropriately and feels comfortable with this robot's responsiveness. (4) The required output of two variables from the human-detecting sensor system simplifies the system.

Even if a mobile robot has the 3-DOF motion capacity, there is no advantage to using 3-DOF motion for this human-guided mapping purpose. Therefore, the present invention can be applied to every mobile robot.

For a robot to track a human, sensors must detect human's action and return data so that the robot can execute an appropriate tracking motion. Because the motion has only 2-DOF, the sensor only needs generate "2-DOF motion command" $C_M$:

$$C_M=(c_v, c_\omega), \qquad (EQ. 3)$$

where, $c_v$ is a variable for controlling translation-speed v and $c_\omega$ a variable for controlling rotation-speed $\omega$ (FIG. 2). 2-DOF motion command $C_M$ is specifically defined to play a standard interface between any sensor task 2031 and the motion task 2032. Their details are given below.

Definitions on Graphs and Maps: An extensive use of a graph to represent an operation area is another feature of the present invention. A graph G is a pair (V, E), where V is a set of "vertices" and E a set of "edges." A vertex is associated with a position (x, y) in the given operation area in the global frame. An edge is a pair (P, Q) of two distinct vertices, P and Q. The two vertices are called its "ends" of the edge. If (P, Q) is an edge, so is (Q, P. A sequence of vertices, $H=(P_0, P_1, \ldots, P_n)$ ($n \geq 1$) is called a "path," if $(P_k, P_{k+1})$ is an edge for $k=0, \ldots, n-1$. A path H is called a "cycle" if $P_0=P_n$ and $n \geq 2$. A cycle is said to be "simple" if all vertices in the sequence are distinct except the last vertex.

The edges in a cycle H encircle a finite area. That area is called the "closed area" of H. Two distinct simple cycles in a graph G are said to be "independent" if those closed areas have no intersection. If an edge belongs to two independent cycles, it is called an "inside edge"; otherwise, it is called a "boundary edge." A vertex P is called a "boundary vertex" if there is at least one boundary edge that has P as one of the ends. A vertex that is not a boundary vertex is called an "inside vertex."

All boundary edges in a graph form a cycle, a "boundary cycle," $H_b$. There are more than one boundary cycle in any graph. There are numerous ways to traverse all vertices and all edges in a given G. The selection of a traversing path is totally left to the human's discretion. However, it is generally recommended to traverse a boundary cycle in G first. The edges and vertices left out of the boundary cycle will be traversed later. In that case, the boundary vertex positions will work as landmarks in determining other vertex positions.

The present invention proposes, given an operation area A, that first a human defines a graph $$G=G(A)=(V, E), \qquad (EQ. 4)$$

which is embedded in A, where V is the set of vertices and E the set of edges. This graph G should appropriately represent the geometrical features of the operation area A. The final output of the mapping session is a map file Z:

$$Z=Z(G)=Z(G(A))=(R_V, R_E), \qquad (EQ. 5)$$

where $R_v$ is the set of vertex records for V and $R_E$ the set of edge records for E. These two record sets are incrementally created during the mapping session. The set of vertex records and the set of edge records form the map of G (and area A). This data is compact and well organized because it is based on the graph structure.

Data structure of a vertex record: A vertex record includes a vertex number, an anchor, a position in the global frame, and a name (string). Each vertex has a unique vertex number n $(=0, 1, 2, \ldots)$ in the order of creation. The n-th vertex may be referred as vertex(n). An anchor is a vertex number m, where this vertex has been localized based on the position of vertex (m). When the record of a vertex is newly created, its anchor is defined as $\infty$; it means that the position is based on nothing. Only exception is vertex(0); its anchor is defined as 0. A vertex with an anchor of $\infty$ is said to be "anchor-less"; otherwise it is "anchored." As the mapping session proceeds, the position and anchor in a vertex record are modified by the localization task 206. At the end of a mapping session, the anchor of all vertices becomes 0. Every vertex name is provided by the human. The set of all vertex names is common symbolic knowledge shared by humans/robot, which enables intelligent and efficient human-robot communication.

Data structure of an edge record: An edge record includes an edge number, two end-vertex numbers, a distance, and geometrical features on both sides. The distance is the Euclidean distance between the two end positions.

Examples of Operation Areas and Their Graphs: Let us present three examples of operation areas and their graphs.

As shown in FIG. 3, an operation area $A_1$ 110 is an area to be vacuum cleaned. This area is only partially bounded by walls. For this area, we may define a graph $G_1$ 111 embedded in $A_1$ to represent the area (FIG. 4). The graph is characterized as $G_1=(V_1, E_1)=(\{A, B, C, D, E\}, \{(A, B), (B, C), (C, D), (D, E), (E, A)\})$. This graph has no inside edges. A boundary cycle in $G_1$ 111 is: $H_{1b}=(A, B, C, D, E, A)$. A clockwise or right-handed boundary cycle, (A, E, D, C, B, A), works as well. In real practice, vertices may have descriptive names, such as "kitchen" or "room 201" rather than A, B, or C.

FIG. 5 illustrates two operation areas $A_2$ and $A_3$ in the same surroundings. $A_3$ 130 stands for the whole reachable area. On the other hand, $A_2$ 120 is the left half of $A_3$, bounded by the dotted line. One might want the mobile robot to recognize the whole area $A_3$ or only a part $A_2$, depending of the requirements.

Operation area $A_2$ 120 can be represented by a graph $G_2$ 121, as shown in FIG. 6: $G_2=(V_2, E_2)=(\{A, B, C, D, E, F, G\}, \{(A, B), (B, C), (C, D), (D, E), (E, F), (F, G), (G, A), (D, G)\})$.

$G_2$ 121 has two independent cycles, (A, B, C, D, G, A) 122 and (G, D, E, F, G) 123, which share an edge, (D, G) 124, which is the only inside edge in $G_2$. Using all boundary edges, a boundary cycle can be formed as: $H_{2b}$=(A, B, C, D, E, F, G, A), in which the inside edge (D, G) is not included.

Operation area $A_3$ 130 can be represented by a graph $G_3$ 131 as shown in FIG. 7: $G_3=(V_3, E_3)=(\{A, B, C, D, E, F, G, H, I, J, K, L, M\}, \{(A, B), (A, L), (B, C), (C, D), (C, G), (D, E), (D, F), (G, H), (G, M), (H, I), (I, J), (J, K), (J, M), (K, L), (L, M)\})$. $G_3$ 131 has three mutually independent cycles, (A, B, C, G, M, L, A) 132, (G, H, I, J, M, G) 133, and (J, K, L, M, J) 134. Therefore, (G, M), (J, M), and (L, M) are inside edges, because each of them is shared by two independent cycles. An example of boundary cycles in $G_3$ 131 is: $H_{3b}$=(A, B, C, D, E, D, F, D, C, G, H, I, J, K, L, A); this cycle does not include the inside edges.

Features of the Solution Method: A human defines a graph G that is embedded in and represents the given operation area A. All the mapping tasks are based on this graph G. The novel concept in the present invention is that a human is deeply committed to the problem solving to this degree. It is very difficult for a robot to understand the geometric relations of an operation area. Since a graph can have any complexity, this method can deal with an operation area of any complexity.

In the same surroundings, a human may want to teach a robot two or more distinct operation areas using the present invention. For instance, two distinct cleaning areas in an office for a vacuum robot can be named as "weekday" and "weekend." The set of names of maps (operation areas) becomes the common symbolic knowledge shared by humans and the robot, serving as an intelligent and efficient interface. This is one of the major advantages of the present invention.

Human-Guided Mapping Method 200: The top-level algorithm of the present invention is shown as Flowchart 200 in FIG. 8.

Task 201: A human defines a graph G that represents the given operation area A; this is the starting point. All the vertices and edges in G must be placed inside the operation area. This graph G should represent A in an optimal manner. Generally, vertices are assigned to T-intersections, cross intersections, L-intersections, dead-end points, and boundary points, because these positions have distinct geometrical importance. For two vertices, an edge is assigned if the human wants the mobile robot to move along the straight segment between them in the forthcoming task execution sessions.

Task 202: At this initial state, the mobile robot is placed a vertex, which is defined as the "home" of G. As the initialization of the mapping function, the vertex record vertex(0, 0, p, name) of this home is created with the number of 0, the anchor of 0, the robot position p, and name that is provided by the human.

Task 203: The human moves forward along an edge and stops at a vertex, while the robot tracks the human. The decision on the path selection is done by the human. The precision of the map depends on this path selection. This task execution by the human-robot team ends at the next vertex, one end of this edge. The details of this task 203 are described below.

Task 204: The vertex where the human-robot team stopped falls in one of two kinds. The team may be stopping at this vertex for the first time; or the team may have visited this vertex before and it came back here again. This information teaches the robot the graph structure.

If the team stops at this vertex for the first time, the human communicates the fact by reporting m=−1, which is not a valid vertex number. If the team has already visited this vertex and has created its record as vertex(m) before, the human communicates the fact by returning that vertex number m ($\geq 0$).

Task 205: This vertex is new and a vertex record should be created. The robot asks the human its name, which is provided by the human. The robot creates a vertex record vertex($n_v$, ∞, p, name), with $n_v$ as the vertex number, an anchor of ∞, the current robot position p, and name which is given by the human.

Task 206: Because the robot comes back to an existing vertex(m) again, a new vertex record is not created. Instead, localization procedures for the robot and for vertices are executed. The details of this task are described below.

Task 207: In this case the present vertex is not new, but the last edge may be new. The robot possesses enough information to make this decision. If needed, go to Task 208 for edge-record creation.

Task 208: The robot creates an edge record. The most important information in it is the two vertex numbers of its ends. This information defines the connectivity of G. Side-object geometrical features are valuable too.

Task 209: The human tells the robot if all the edges in G have been traversed or not. Only the human possesses this knowledge.

Task 210: As the last task, the robot outputs the map Z(G) of G, which includes the set $R_V$ of vertex records and the set $R_E$ of edge records. The former has been accumulated in Tasks 202 and 205, and modified in Task 206; the latter has been accumulated in Task 208. The map $Z=(R_V, R_E)$ is output with a unique file name. This map is later retrieved by its name.

Task 206: Localizing Robot and Vertices with vertex(m): The robot has just stopped at vertex(m), which had been created before. Through this vertex identification taught by the human, the robot unambiguously understands the connectivity in G. Furthermore, the robot can correct its own position, the positions and anchors of other vertices. First, an "odometry error correction" e is computed (as preparation for vertex localization) and second, the robot position (a part of the robot frame) is localized:

$$e=(x_e, y_e)=(x_m-x, y_m-y), \qquad \text{(EQ. 6)}$$

$$(x,y)=(x_m, y_m), \qquad \text{(EQ. 7)}$$

The reasoning of this localization is that the previous vertex position $(x_m, y_m)$, which is the robot position then, does not include any potential odometry errors; hence, the old value is considered 'more correct' than the present robot position (x, y).

Now we can discuss on the vertex-localization part. Consider the last part of the path H that the team has made:

$$H=(\ldots, \text{vertex}(n-3), \text{vertex}(n-2), \text{vertex}(n-1), \text{vertex}(m)) \qquad \text{(EQ. 8)}$$

The team was going to create vertex(n), but actually it turns out to be equal to vertex(m) and was not created. We examine this sequence in a reverse order from vertex(n−1) and see which one appears first, vertex(m) itself or an anchored vertex?

(Case I: vertex(m) itself comes first) In this case, the path becomes:

$$H=(\text{vertex}(m), \text{vertex}(m+1), \ldots, \text{vertex}(n-1), \text{vertex}(m)), \qquad \text{(EQ. 9)}$$

where n≧m+2 and all the vertices except the first/last are anchor-less. This path H is a cycle.

(Case II: an anchored vertex comes first) This case is further divided into two sub-cases. The first sub-case is where vertex(n−1) in (EQ. 8) is actually anchored. In this sub-case, there is no anchor-less vertex in H and the following vertex localization is not necessary. In the other sub-case, the path becomes:

$$H=(\text{vertex}(i), \text{vertex}(j), \text{vertex}(j+1), \ldots, \text{vertex}(j+k), \text{vertex}(m)),$$ (EQ. 10)

where vertex(i) is anchored, k≧0, and all the vertices in-between are anchor-less.

The vertex localization algorithms for both cases are almost identical, and hence, only the first case is described here:

The number u of the edges in the cycle H in (EQ. 9) is $$u = n - m (\geq 2)$$ (EQ. 11)

With u and the odometry error correction e in (EQ. 6), the correction values for the vertices in this cycle are evaluated as:

$$0, e/u, 2 \times e/u, \ldots, (u-1) \times e/u, e$$ (EQ. 12)

These values are added to the positions of each vertex in H in (EQ. 9). Here 0=(0, 0). Thus, the odometry error accumulated in the traversing of His distributed equally among the vertices in the cycle. Now the anchors of all vertices in H is set to min(m, anchor(vertex(m))), but the anchor of vertex(m) stays.

So far, it was assumed that "inner cycles" in the cycle H do not exist. Now, consider a case where there is an inner cycle $H_I$41 in H40, as illustrated In FIG. 9. The inner cycle 41 starts from a vertex(h) 42. Because the inner cycle $H_I$41 had been already closed before the larger cycle H40 is closed, the localization task 206 for $H_I$ 41 had been executed and the vertices in $H_I$41 have the anchor of h except vertex(h) itself. The localization on the larger cycle H40 is executed excluding the inner-cycle vertices. After that, the localization value for vertex(h) in (EQ. 12) is uniformly superimposed to the vertices in the inner cycle of $H_I$41. Furthermore, the anchors of the vertices in the inner cycle are changed to that of vertex (h). Thus, Task 206 is recursively applied to nested cycles.

The effectiveness and robustness of the localization algorithms are one of the most important features of the present invention. The human plays crucial roles in the localization; otherwise the results at this level could never be attained. How the human-guided mapping algorithm 200 and the localization algorithm 206 work on the prior graph examples?

In $G_I$ 111 shown in FIG. 4, when the boundary cycle is traversed, the team makes a cycle and the localization task 206 is executed for the cycle. All the anchors becomes 0, which means that all their positions are based on the home position. There is no inner edge and all the edges are traversed.

In $G_2$ 121 shown in FIG. 6, when the boundary cycle is traversed, the localization task 206 is executed for the cycle. An inside traversing for (G, D) 124 is next traversed and its edge record is created. However, no further localization is executed for the inside-vertex traversing, because there is no anchor-less inside vertex.

In $G_3$ 131 shown in FIG. 7, first the boundary cycle is traversed. The boundary cycle contains several inner cycles: (D, E, D), (D, F, D), (D, E, D, F, D), and (C, D, E, D, F, D, C). Localization 206 is executed recursively on these inner cycles and the whole boundary cycle. Notice that these cycles are nested. Next the inner edges must be traversed. Let us assume that an inside path (J, M, G) is chosen (because this inner path is straight and is advantageous for side-object feature extraction). Then, at the end of this traversing, Task 206 is executed, and as the result, the position of vertex M is localized with an anchor of 0. Then the rest of the inside edge, (M, L), is traversed to create its edge record.

Human guides robot along an edge 203: The human guides the robot along one edge in this task. The flowchart is shown in FIG. 10.

Task 2030: The robot waits until the human starts forward walking.

Task 2031: The robot detects a 2-DOF motion command $C_M$ by sensing the human's action as depicted in FIG. 2. Details of Task 2031 are given below.

Task 2032: Using the motion command $C_M$, the robot controls its 2-DOF motion as depicted in FIG. 2. Details of Task 2032 are given below.

Task 2033: The robot extracts geometrical features of left/right objects, while traversing this edge. Details of Task 2033 are given below.

Task 2034: The robot waits for the next timer interrupt, and then leaves this program point.

Task 2035: If the human is still moving forward, the robot repeats the previous four tasks again; otherwise exit this task 203.

Detecting Motion Command 2031: While the human traverses an edge, the robot tracks the human. To track the human, the robot detects the human's action through a sensor system. This task 2031 outputs a sensing result, which is a standard interface, a 2-DOF motion command $C_M=(c_v, c_\omega)$ at each sampling time, as shown in FIG. 2. We discuss four typical sensing methods among others: Task 20310: a position sensing method, Task 20311: a force-torque sensing method, Task 20312: a force sensing method, and Task 20313, a joystick method. (Task 20310) Human-Position Sensing: In this method, the mobile robot detects the human's position. This is a non-contact sensing method. Suppose the human stands in front of the robot 1 as shown in FIGS. 11A, 11B, and 11C. In each case, the sensor system detects the human's position $(x_h, y_h)$ in the robot frame 4.

In FIG. 11A, several ultrasonic-range finders (sonars) 20s are mounted on the front perimeter of the mobile robot 1. The sonar system detects the human's position by analyzing the ranges. In FIG. 11B, a laser range-finder 21 is mounted in front of a robot 1 to detect the human's position.

In FIG. 11C, the human's position is detected by sensor coordination; $S_L$, $S_R$, and S are ultrasonic-wave transmitter/receiver systems 22. $S_L$ and $S_R$ are mounted at the front-left and front-right corners of the mobile robot, and the third system S is held by the human 10. The human's position $(x_h, y_h)$ can be computed in the following three steps: (1) Both $S_L$ and $S_R$ transmit sonic waves at time $T_0$. (2) When S receives the first sonic waves from either $S_L$ or $S_R$, S immediately sends back sonic waves. (3) $S_L$ records time $T_L$ when it receives the return sonic wave. $S_R$ records time $T_R$ when it receives the return sonic wave. The robot knows the onboard system's positions in the robot frame and the sonic-wave velocity. Therefore, using the triangulation, the robot can compute the position $(x_h, y_h)$.

With each of the method described above, the human's position $(x_h, y_h)$ in the robot frame is obtained. The Cartesian coordinates are converted into $(d_h, p_h)$ in the polar coordinate system using the following standard equation:

$$(d_h, p_h) = ((x_h^2 + y_h^2)^{1/2}, a\tan2(y_h, x_h))$$ (EQ. 13)

where $d_h$ is the distance from the robot frame's origin 4 to the human and $p_h$ the direction relative to the X-axis direction in the robot frame 4. These polar coordinates are further translated into a 2-DOF motion command as follows:

$$C_M=(c_v, c_\omega)=(g_0\times(d_h-D_N), g_1\times p_h) \quad (EQ.\ 14)$$

Here $D_N$ is a "neutral distance" and, $g_0$ and $g_1$ are constant conversion factors. If the human stops while letting the robot track, the robot will eventually stop keeping this neutral distance $D_N$ between them (Task 2032 functions in this way). Thus, if these sensors are used in the human-in-front situation, the 2-DOF motion command $C_M$ is detected.

(Task 20310 continued): In some situations, the human may want to guide the robot in other positional relations than the front position. In the following two examples, the human positions him or herself to the left side of the robot 1 (other cases can be handled by a similar algorithm). The laser range finder 21 detects the human's "actual position" $(x_a, y_a)$ 11 in FIG. 12A. In FIG. 12B, $S_F$, $S_R$, and S are ultrasonic-wave transmitter/receiver systems 22s, as Introduced in FIG. 11C. $S_F$ and $S_R$ are mounted at the left-front and left-rear corners of the mobile robot, and the third system S is held by the human 10. With a similar method adopted for the sensor system shown in FIG. 11C, the human's actual position $(x_a, y_a)$ 11 can be obtained.

In this human-left positioning, there exist coordinates $(X_T, Y_T)$ which satisfy the condition that, if the human's actual position $(x_a, y_a)=(X_T, Y_T)$, the human wants the robot does not move, or equivalently $M=(v, \omega)=(0, 0)$. This position can be called a "neutral position" (in this human-left case, $Y_T>0$). Using these constants, we convert a human's actual position $(x_a, y_a)$ into a human's "virtual position" $(x_h, y_h)$ as follows:

$$(x_h, y_h)=(x_a-X_T+D_N, y_a-Y_T) \quad (EQ.\ 15)$$

Having these $(x_h, y_h)$, (EQ. 13) and (EQ. 14) are applied again to obtain the 2-DOF motion command $C_M$ for the next task 2032.

(Task 20311) Force-torque sensing method: The human 1 contacts the mobile robot through a force-torque sensor, which detects force and torque applied to the robot by the human. Even though the human applies force and torque to the robot, that does not mean the human forcibly drags, pushes, or turns the robot. The robot senses small force and torque; that information is conveyed to its motion-control algorithm to move its body, which may be heavy.

A force applied toward the robot's body direction tends to increase the robot's translation speed v. A force applied to the robot in the other direction tends to move the robot backward. A counterclockwise torque in the horizontal plane about the vertical axis tends to turn the robot 1 to the left; a clockwise torque tends to turn it to the right.

To embody this concept, "sensor fixtures" are introduced here. As illustrated in FIG. 13A, a sensor fixture 30 consists of three physical parts that are serially assembled together from left to right: (a) a left end part 31, which is attached to a mobile robot, (b) a force-torque sensor 32, and (c) a gripper 33, which is held by a human. Part (b) 32 must report two variables: (1) a force $f_h$, which is the inner product of the total force applied and the unit vector In the robot's body direction 3, and (2) a torque $q_h$, which is the torque component that is about the vertical axis. Although a full six-degrees-of-freedom force-torque sensor may be used, only these two components are needed for this motion-commanding purpose. In this and other sensor fixtures, the direction of $f_h$ is aligned to the robot's body direction 3, which is not explicitly depicted in the drawings FIG. 14A illustrates an embodiment where a sensor fixture 30 is mounted at the front end of a robot 1. A human takes the gripper 33 to guide the robot 1. FIG. 14B illustrates another embodiment where a sensor fixture 30 is mounted at the left side of the robot, so that the human-robot team walks side-by-side.

A variation of sensor fixture 34 shown in FIG. 13B is different from the first one only in Part (a), which is a gripper 35 that is supposed to be held by an armed robot. The robot grips 35, so that the human can communicate his or her intention by force and torque.

The third sensor fixture 36 in FIG. 13C is different from 34 in Part (a), which consists of two grippers 37s that are supposed to be held by a robot with two hands. The human positions him or herself in front of the robot, holds a gripper 33, and guide the robot, which grips a sensor fixture 36 with two hands.

In each sensor-fixture embodiment, a pair $(f_h, q_h)$ of force and torque is obtained. This pair is converted into a 2-DOF motion command by the following equation:

$$C_M=(c_v, c_\omega)=(g_2\times f_h, g_3\times q_h), \quad (EQ.\ 16)$$

where $g_2$ and $g_3$ are positive conversion constants. This 2-DOF motion command $C_M$ is the output of Task 20311 and becomes an input to Task 2032.

(Task 20312) Force-sensing method: The human's intention on the robot's motion is conveyed through an elastic string 40 depicted in FIG. 15. Its one end is connected to a force sensor 41, which is mounted on the robot 1 at (a, 0) in the robot frame 4 (a>0). The other end is held and pulled by the human to guide the robot. When the human pulls the string in the forward direction, the robot is supposed to move forward; otherwise, the robot stops. When the human pulls the string in either left or right, the robot is supposed to turn in either direction.

The horizontal component f42 of the force applied to the robot is detected by the force sensor 41 and is decomposed into two orthogonal components: $f_x$43 in the X-direction and $f_y$44 in the Y-direction in the robot frame 4. These force components are translated into a 2-DOF motion command by the following equation:

$$C_M=(c_v, c_\omega)=(g_4\times f_x, g_5\times f_y), \quad (EQ.\ 17)$$

where $g_4$ and $g_5$ are positive conversion constants. This 2-DOF command $C_M$ is the output of Task 20312 and an input to Task 2032.

(Task 20313) Joystick method: A human communicates with a mobile robot through a joystick, which is not contacting the robot. The X-component $x_j$ and Y-component $y_j$ of the joystick displacement outputs are transmitted to the robot through a communication channel and are converted into a 2-DOF motion command as follows:

$$C_M=(c_v, c_\omega)=(g_6\times x_j, g_7\times y_j), \quad (EQ.\ 18)$$

where $g_6$ and $g_7$ are positive conversion constants. Thus, Task 20313 reports a 2-DOF motion command for the next task 2032.

Task 2032: Executing Motion Command: The purpose of this task is to embody the robot's 2-DOF motion given a standardized 2-DOF motion command $C_M=(c_v, c_\omega)$, which is an output of Task 2031 as shown in FIG. 2. This task 2032 is composed of two sub-tasks: Task 20320 which is a translation-speed (v) controlling task with $c_v$ and Task 20321 which is a rotation-speed ($\omega$) controlling task with $c_\omega$:

(Task 20320) Translation Speed Control: A typical feedback-control algorithm for translation speed v is the following:

$$a=a+(-A_0\times a-A_1\times v+A_2\times c_v)\times dt, \quad (EQ.\ 19)$$

$$v=v+a\times dt, \quad (EQ.\ 20)$$

where α is the acceleration, dt a sampling time interval, and $A_0, A_1, A_2$ positive feedback gains. The symbol "=" stands for substitution in the last two equations. Namely, the translation speed is obtained by two integrations. Due to these integrations, the robot's translation speed control is extremely smooth.

This rule moves robot forward if $c_v>0$ ($d_h>D_N$ in the position-sensing method and $f_h>0$ in the force-control method). In this forward-moving state, we say the human is "pulling" the robot. The robot moves backward if $c_v<0$. In this backward-moving state, we say the human is "pushing" the robot.

If the human stops walking after pulling the robot, the robot eventually stops. However, because of the human's fuzzy stopping and inevitable disturbances of the sensor output, the robot's stopping behavior is not very crisp. Furthermore, the robot tends to oscillates between the push/pull states before it really stops, because the effect of the input $c_v$ to speed v in (EQ. 19) and (EQ. 20) is symmetric in both positive and negative regions.

However, in some applications, this symmetric property of translation speed control is undesirable. The human-tracking motion is one of such cases, where backward motion is neither necessary nor useful. The human wants only to pull or to stop the robot. A simple way to embody this requirement is replacing (EQ. 20) by $$v=\max(v+\alpha \times dt, 0) \tag{EQ. 21}$$

Then the robot never moves backward. Under this rule, when $c_v$ becomes negative, the robot eventually stops and is stable.

Likewise, there are some applications, in which only backward motion is desirable. A simple method to embody this requirement is replacing (EQ. 20) by $$v=\min(v+\alpha \times dt, 0) \tag{EQ. 22}$$

This completes the algorithm description for Task 20320.

(Task 20321) Rotation Speed Control: A typical feedback-control algorithm for rotation speed ω with $c_\omega$ is:

$$\xi = \xi + (-B_0 \xi - B_1 \times \omega + B_2 \times c_\omega) \times dt, \tag{EQ. 23}$$

$$\omega = \omega + \xi \times dt, \tag{EQ. 24}$$

where ξ is the time derivative of ω (the acceleration of rotation speed), dt a sampling time interval, and $B_0, B_1, B_2$ positive feedback gains. In the last two equations, an (=) symbol means an assignment operation. Due to the two integrations to obtain ω, the rotation speed control is extremely smooth. If $c_\omega>0$ (the robot detects the human on Its left in the position-sensing method, or the human applies a counterclockwise torque in the torque-sensing method), the rotation speed ω eventually becomes positive so that the robot turns left; If $c_\omega<0$, the rotation speed w eventually becomes negative so that the robot turns right. In either case, the robot's body direction eventually turns toward the human.

This completes the 2-DOF motion control algorithm of Tasks 20321 and 2032.

Task 2033: Extract Side Features along Edge: While traversing an edge tracking a human, the robot can extract geometric features on both left and right sides using its side sensors. At the end of an edge traversing, this geometrical information is saved in the edge record created. Walls and furniture are typical examples of side objects.

One typical side-object-feature-extraction method is the one using sonars and the least-squares-fit algorithm. In FIG. 16, a left-looking sonar 20 is mounted on a mobile robot 1 in a horizontal plane and returns a range of d. We can estimate the two-dimensional object spot that should have generated the sonic echo as follows: Let F be the robot frame 4, and let S20 be the sonar frame in the robot frame 4. A transformation G=((d, 0), 0) is the relation between S and "target frame" T15. By composing the three frames (transformations) F, S, and G, we obtain the target frame T as:

$$T=F\#S\#G, \tag{EQ. 25}$$

where a (#) symbol stands for the composition of two-dimensional transformations. By extracting the position component from frame T, we obtain the estimated "target position" $T_p$.

As the robot moves, a sonar scans surrounding objects and reports a target position ($T_p$) sequence. By applying the least-squares-fit algorithm to the position sequence, we can obtain a linear segment. This abstract and compressed data is handily fit to an edge record and will be used for navigating and localizing the robot in a future.

Recording Human-Guided Motion: For playback and other purposes, a human-guided robot's 2-DOF motion can be recorded as a "motion file," which is a set of "motion records." An nth motion record includes (a) a translation speed $v_n$ and (b) a rotation speed $\omega_n$. Let us assume that the range of n is [0, N–1]. Notice that a motion file is hardware independent; a motion file created on a mobile robot can be reproduced on another robot which has a different hardware system.

Motion Playback of Human-Guided Motion: Having a motion file, the original 2-DOF motion can be reproduced using the translation speed $v_n$ and rotation speed $\omega_n$ in one of the two ways, forward and backward playback:

(0) Forward playback: In this playback session, each motion M=($v_n, \omega_n$) is reproduced for n=0 to N–1. The reproduced translation direction of the robot is the same as the recorded translation direction.

(1) Backward playback: In this playback session, each motion M=($-v_n, -\omega_n$) is reproduced for n=N–1 to 0. The reproduced translation direction of the robot is the opposite direction of the one in the recorded translation direction.

An embodiment of a 2-DOF motion M=(v, ω) is illustrated in FIG. 17, taking the differential-drive wheel architecture as an example. A mobile robot with the wheel architecture has a left-driving wheel 60 and a right-driving wheel 61 (casters are not shown here). Its left wheel speeds $v_L$ and right wheel speed $v_R$ are computed from M=(v, ω) as follows:

$$v_L=v-D\times\omega, \tag{EQ. 26}$$

$$v_R=v+D\times\omega, \tag{EQ. 27}$$

where D is one half of the tread. If these wheel-speeds are embodied, the original 2-DOF motion M=(v, ω) is reproduced.

BRIEF DESCRIPTION OF DRAWINGS

FIG. 13A illustrates a sensor fixture 30.

FIG. 13B illustrates another sensor fixture 34.

FIG. 13C illustrates another sensor fixture 36.

BEST MODE FOR CARRYING OUT THE INVENTION

Figure 1:
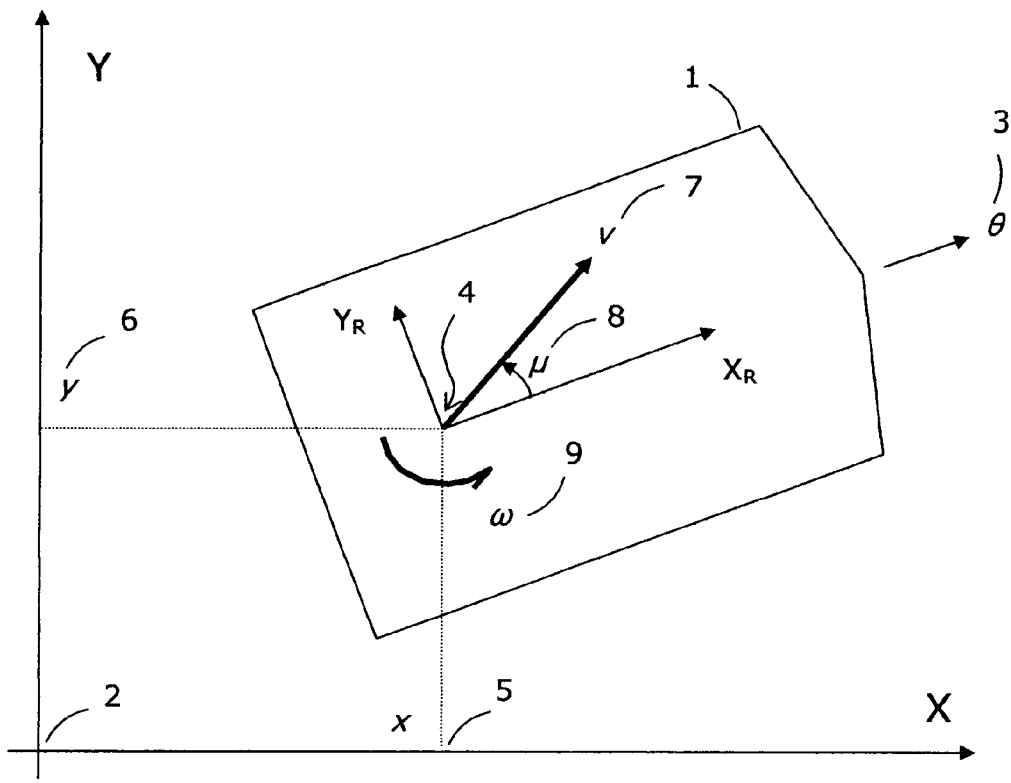
FIG. 1 illustrates that a mobile robot possesses 3-DOF in motion with a translation speed v, direction μ, and rotation speed ω.
Figure 2:
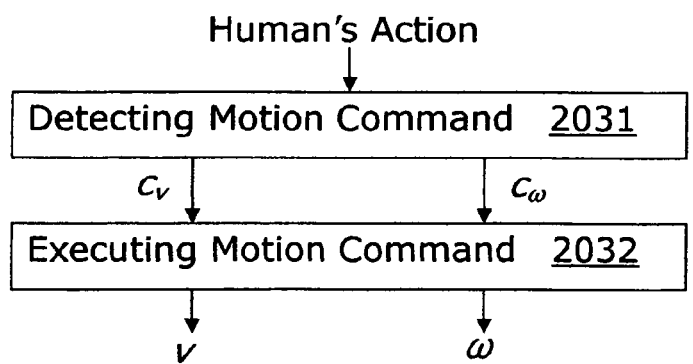
FIG. 2 shows a sensor system which detects human's action and obtains a 2-DOF motion command $C_M$=($c_v, c_\omega$) in Task 2031, and Task 2032 which executes a 2-DOF motion (v, ω) based on the command.
Figure 3:
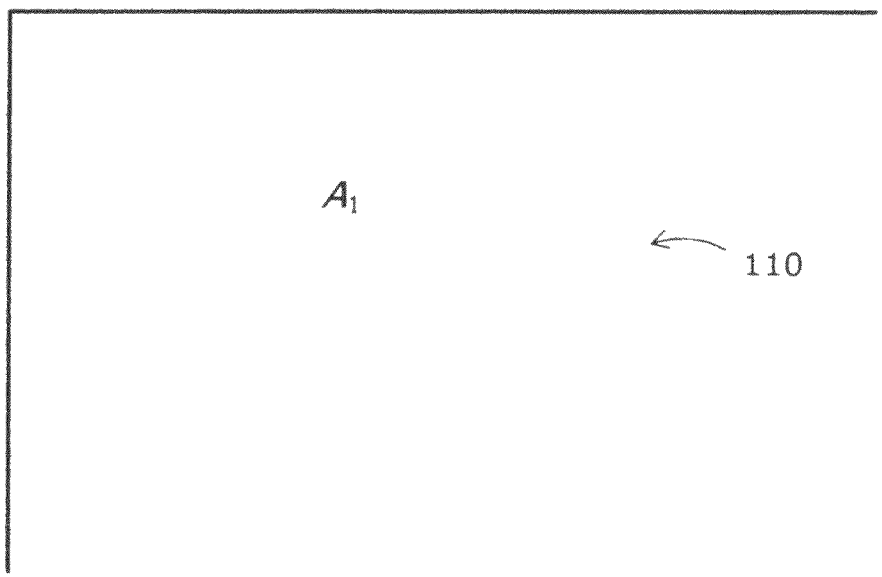
FIG. 3 shows a small cleaning area $A_1$, which is cut out from a larger area.
Figure 4:
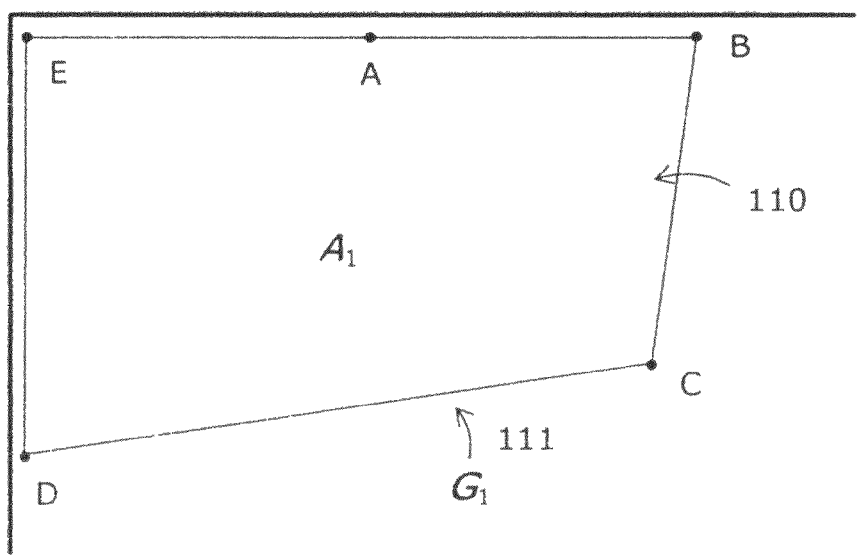
FIG. 4 is a graph $G_1$ that represents operation area $A_1$ in FIG. 3.
Figure 5:
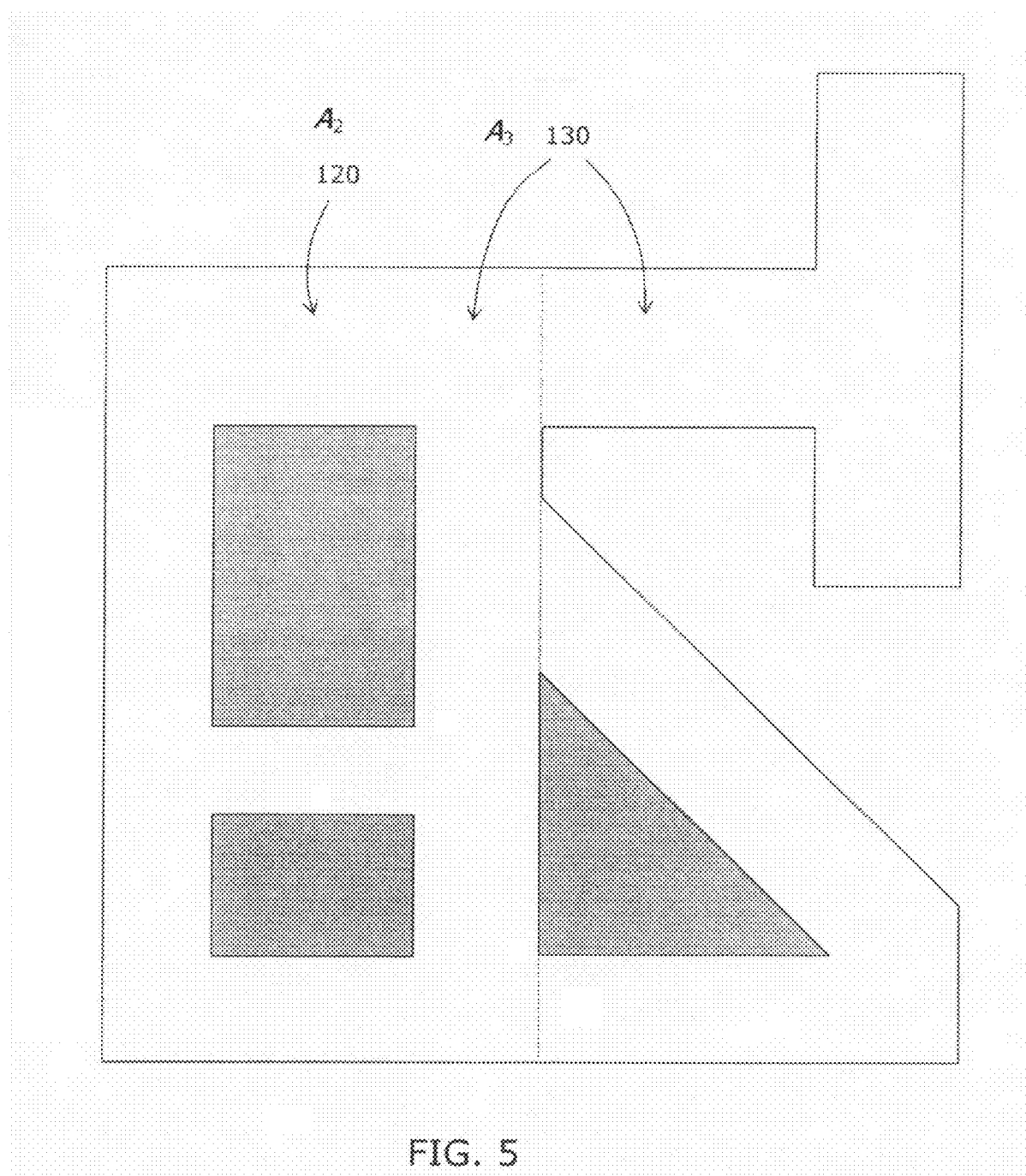
FIG. 5 shows two operation areas for a mobile robot. $A_3$ is the whole area and a smaller operation area $A_2$ the left half bounded by the dotted line.
Figure 6:
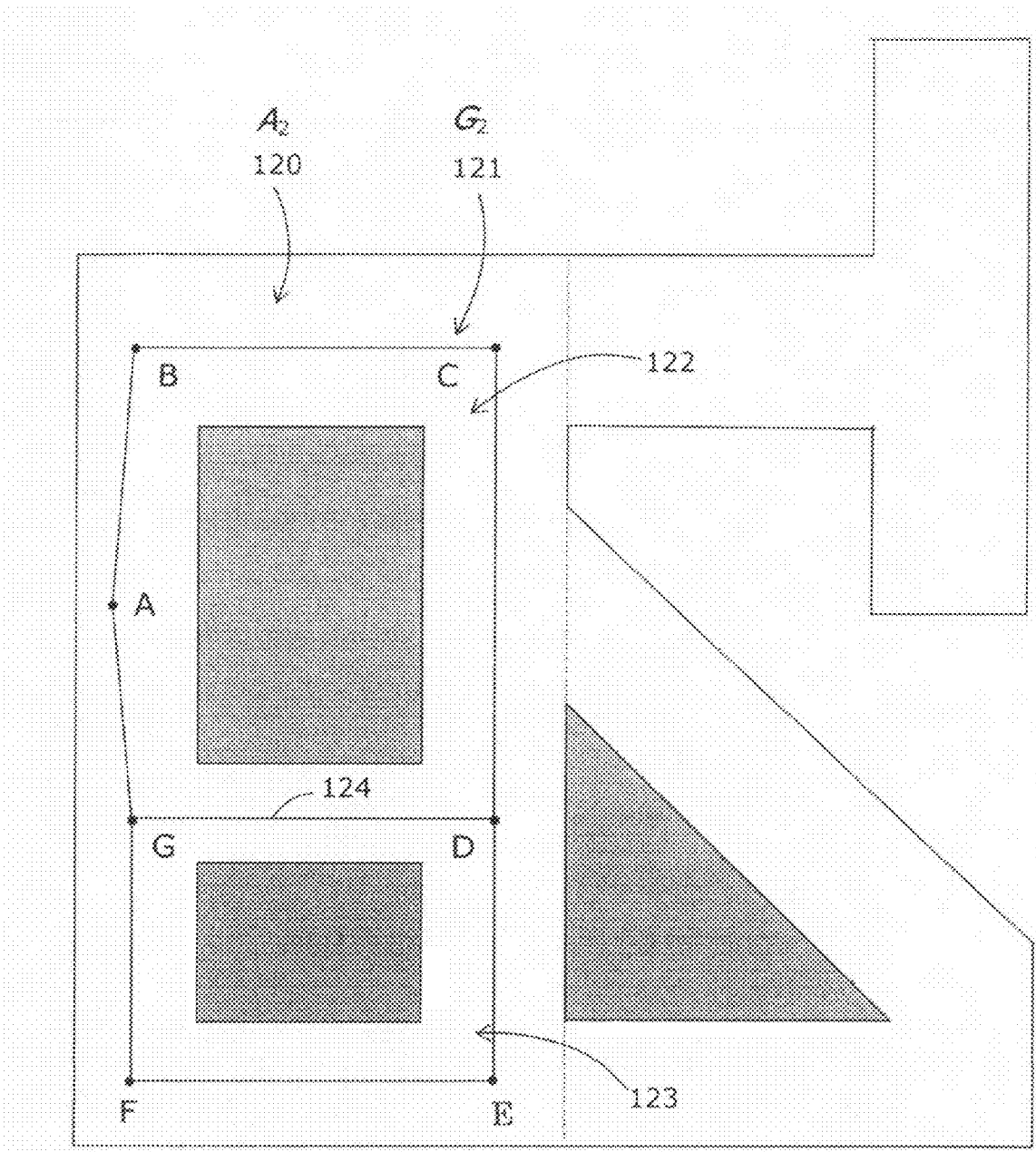
FIG. 6 is a graph $G_2$ that represents operation area $A_2$ in FIG. 5.
Figure 7:
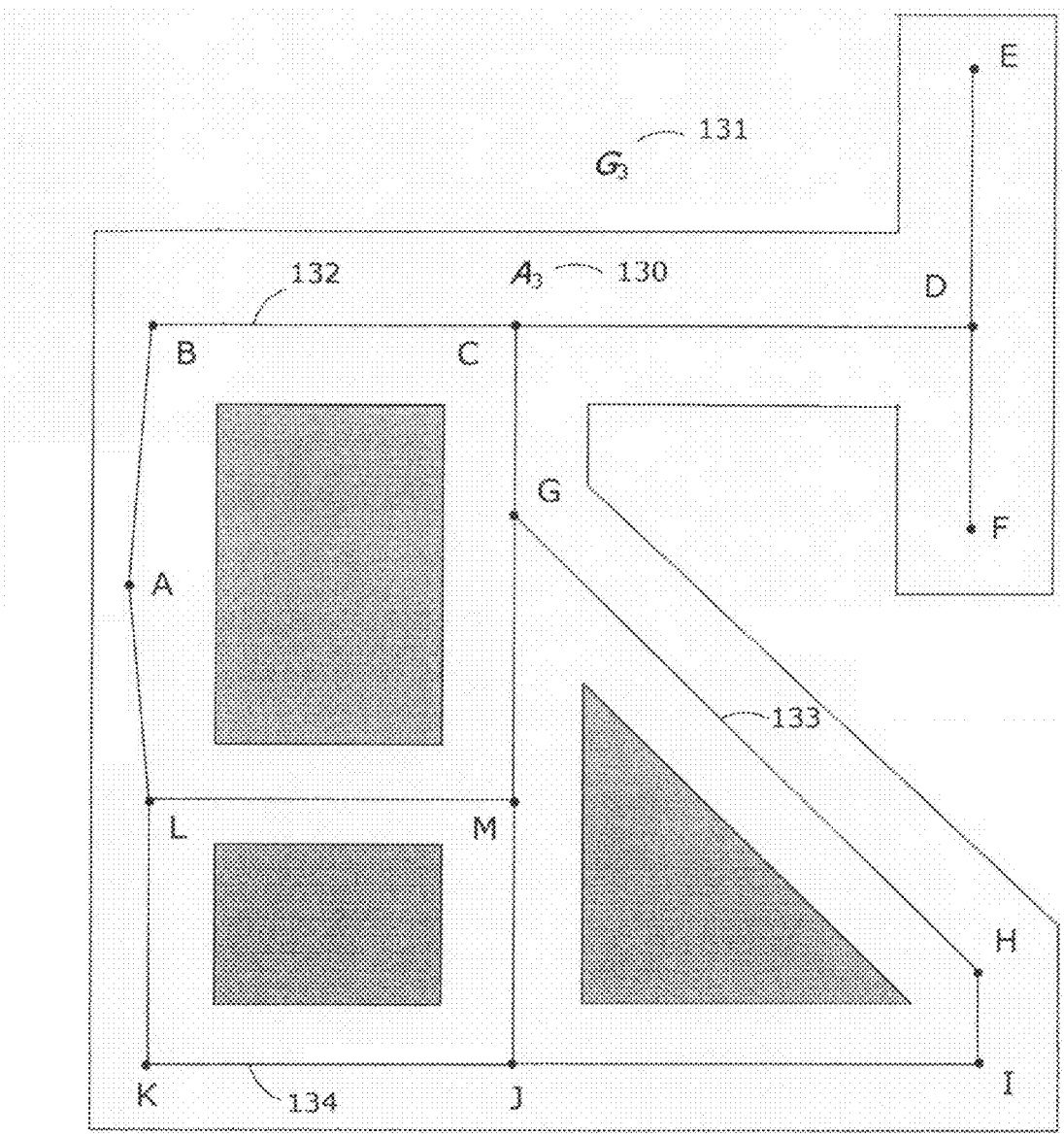
FIG. 7 is a graph $G_3$ that represents operation area $A_3$ in FIG. 5.
Figure 8:
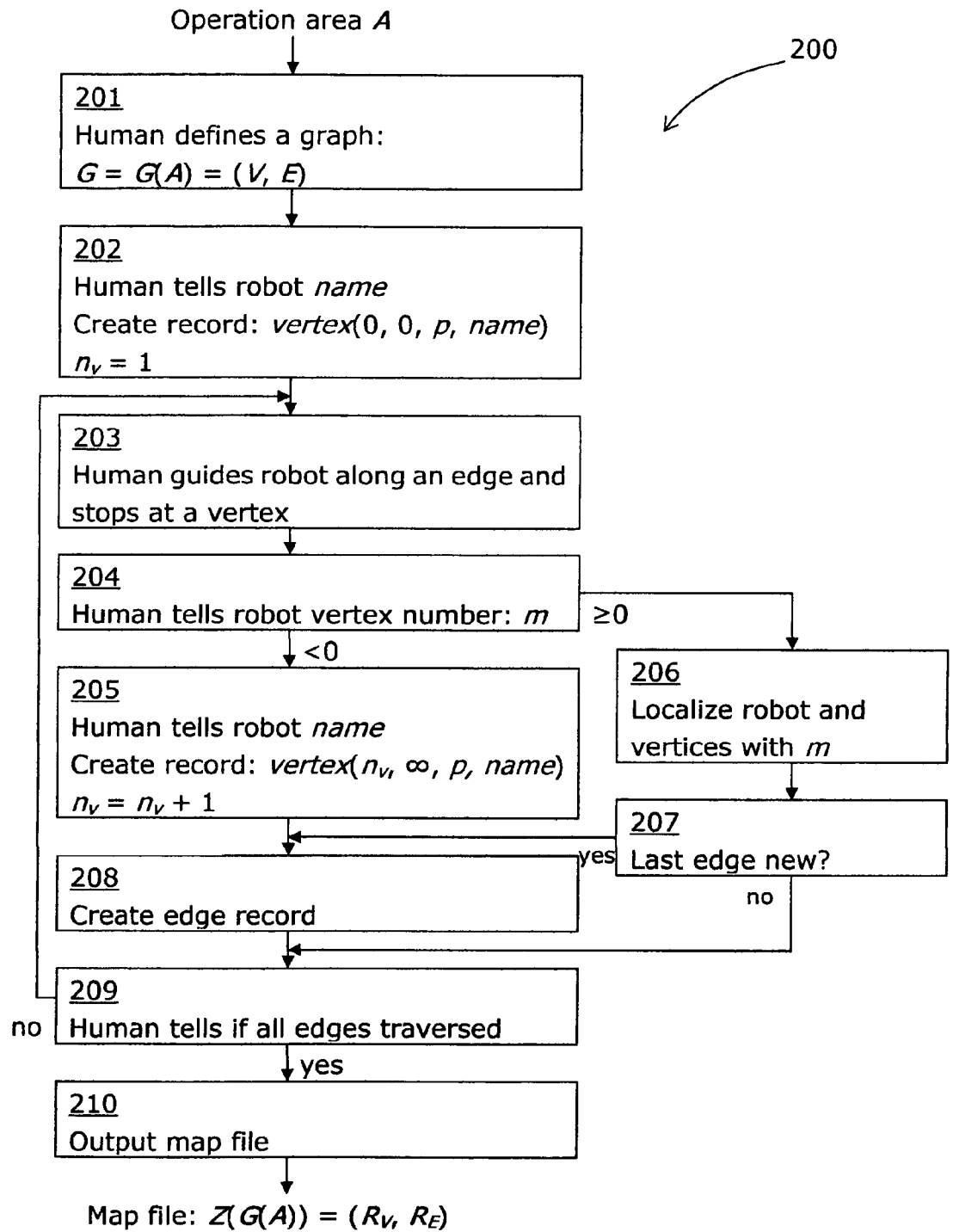
FIG. 8 is the flowchart of the human-guided mapping algorithm 200.
Figure 9:
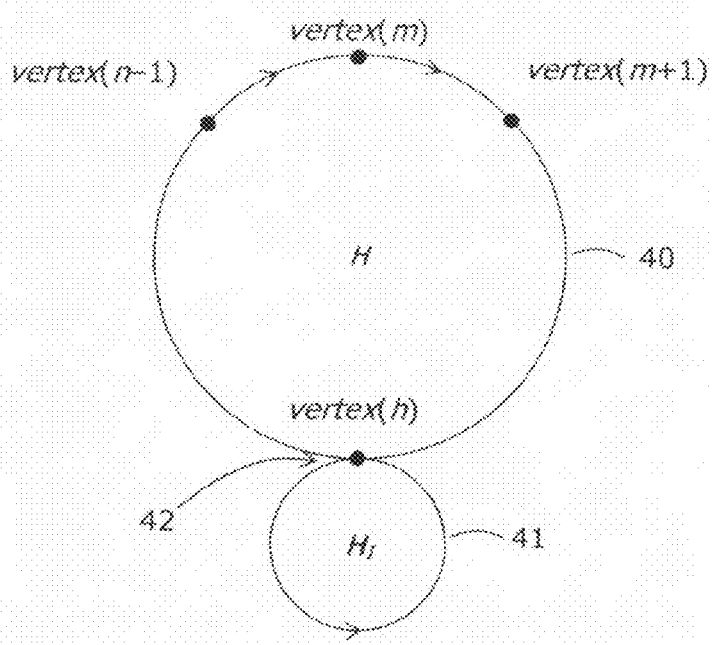
FIG. 9 shows a cycle H40 with an inner cycle $H_I$ 41.
Figure 17:
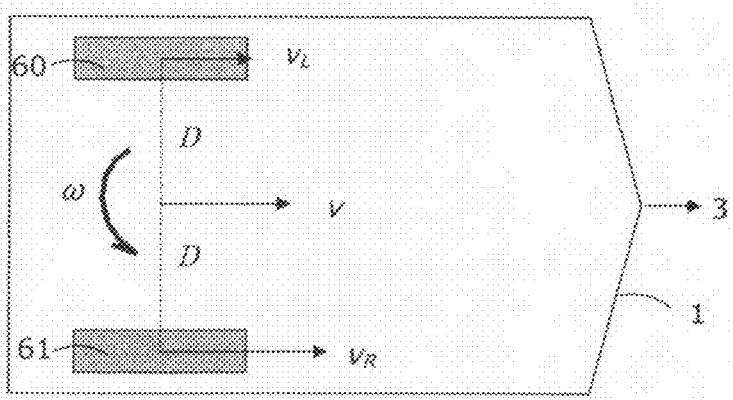
FIG. 17 is a plan of a differential-drive type mobile robot 1.
Figure 10:
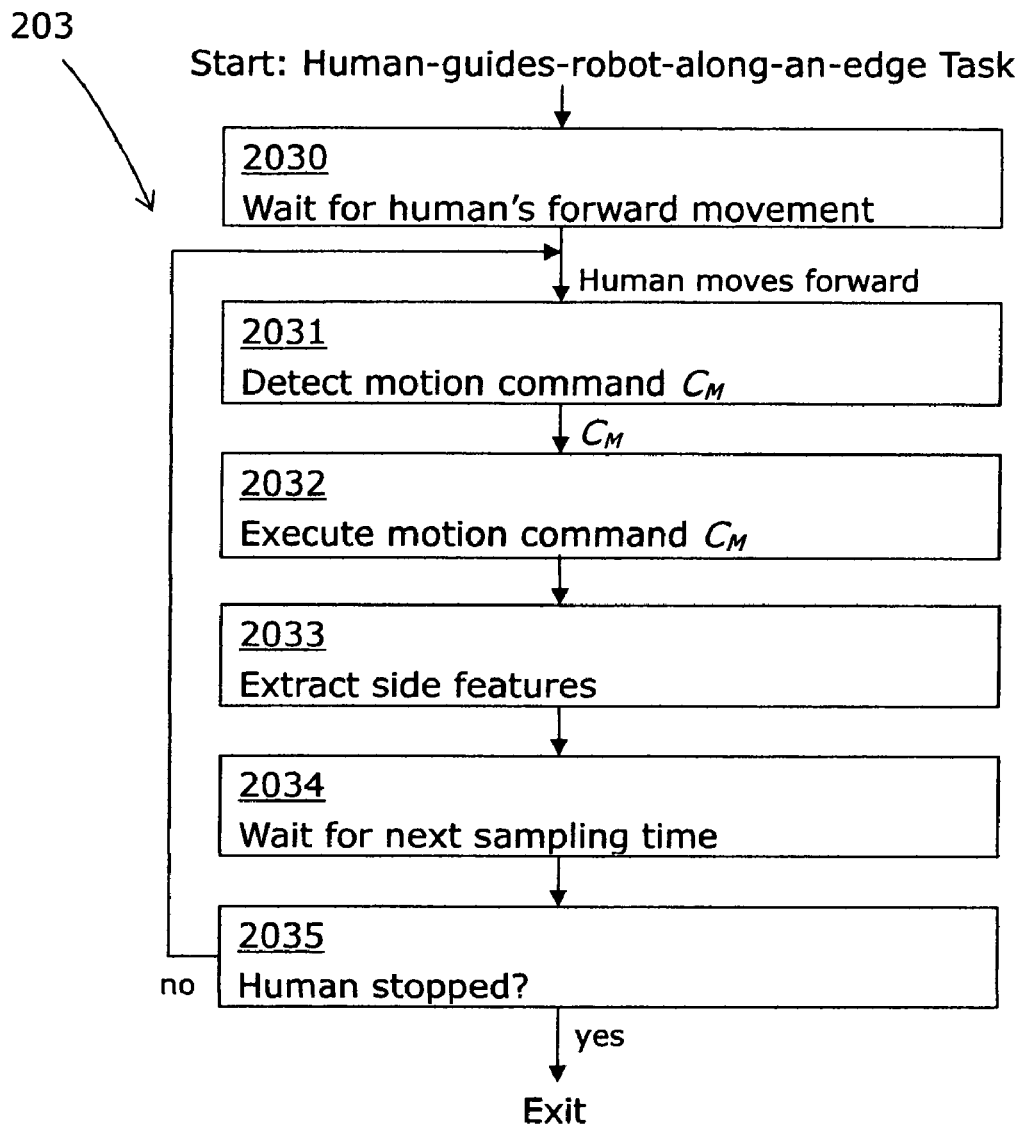
FIG. 10 is the flowchart of how a human guides a robot along an edge 203.
Figure 11A:
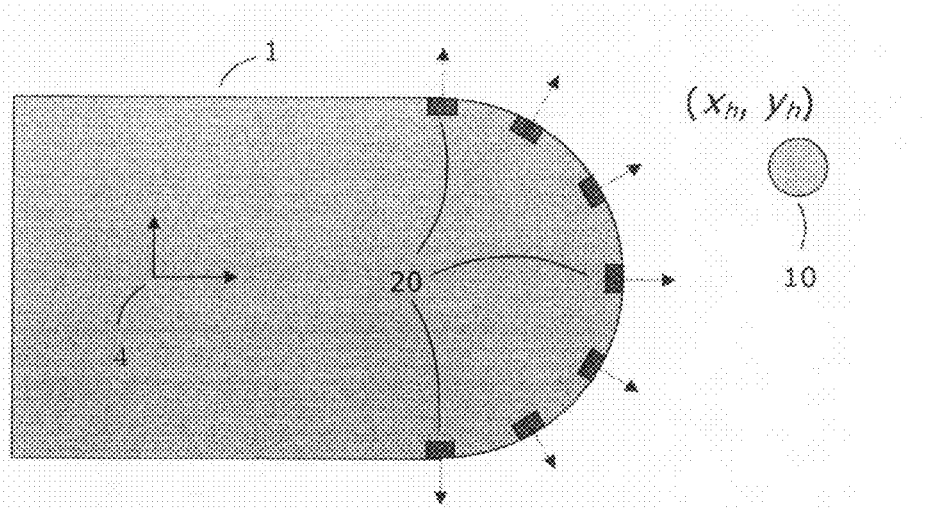
FIG. 11A is a mobile robot on which a system of several sonars is mounted in front. The system detects the human's position $(x_h, y_h)$.
Figure 11B:
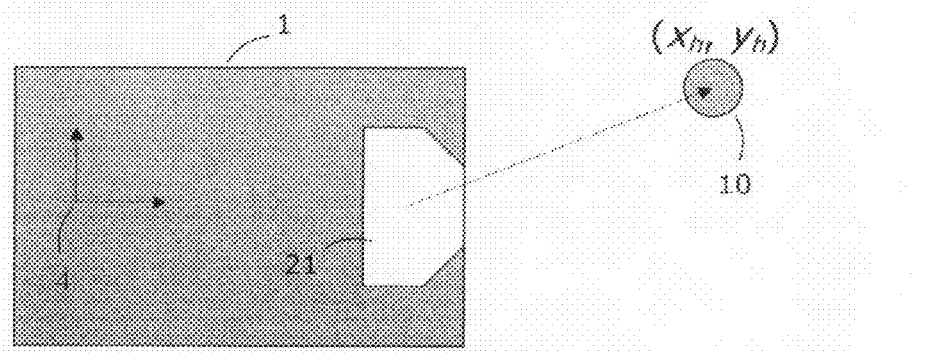
FIG. 11B is a mobile robot on which a laser range finder is mounted in front. The finder detects the human's position $(x_h, y_h)$.
Figure 11C:
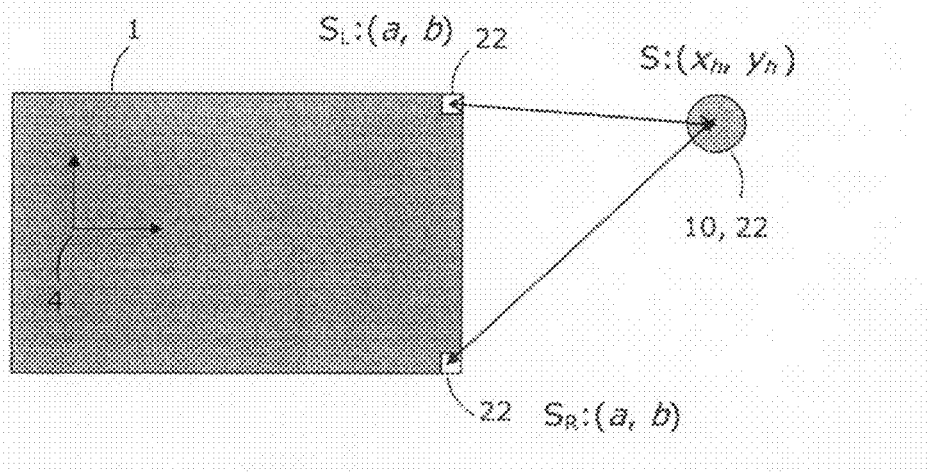
FIG. 11C is a mobile robot, which mounts sensor systems $S_L$ and $S_R$. A human holds another sensor system S. These sensor systems coordinate to detect the human's position $(x_h, y_h)$.
Figure 12A:
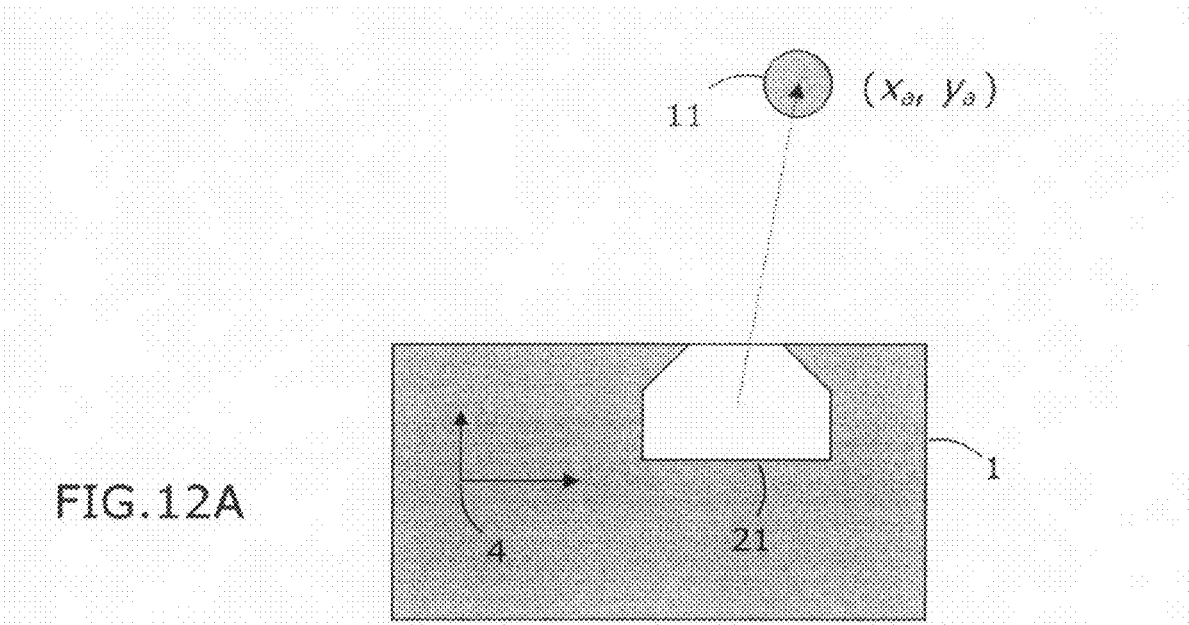
FIG. 12A is a mobile robot on which a laser range finder 21 is mounted on its left side. The finder 21 detects the human's actual position $(x_a, y_a)$ 11 in the robot frame 4.
Figure 12B:
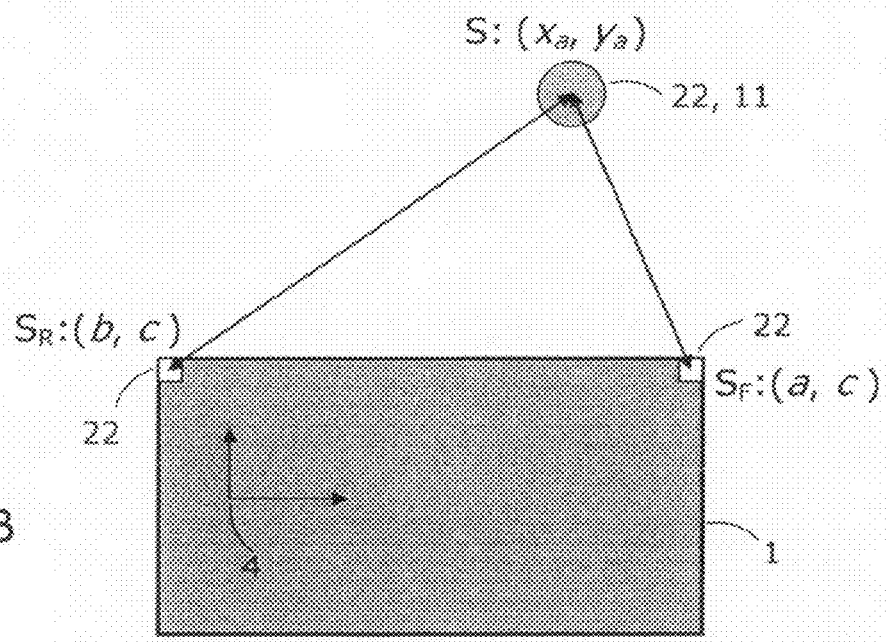
FIG. 12B shows a mobile robot, which mounts sensor systems $S_F$ and $S_R$. A human is holding another sensor system S at the robot's left side. These sensor systems coordinate to detect the human's actual position $(x_a, y_a)$ 11.
Figure 14A:
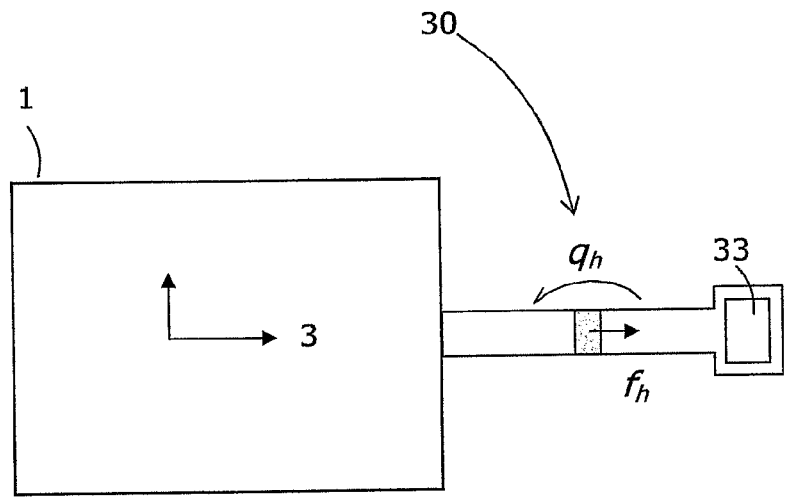
FIG. 14A illustrates a robot on which a sensor fixtures 30 is mounted in front.
Figure 14B:
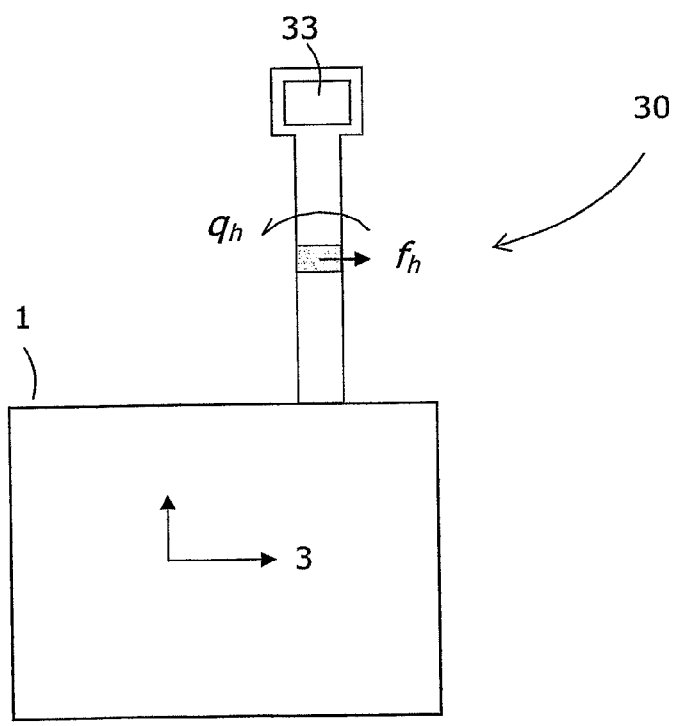
FIG. 14B illustrates a robot on which a sensor fixtures 30 is mounted on its left side.
Figure 15:
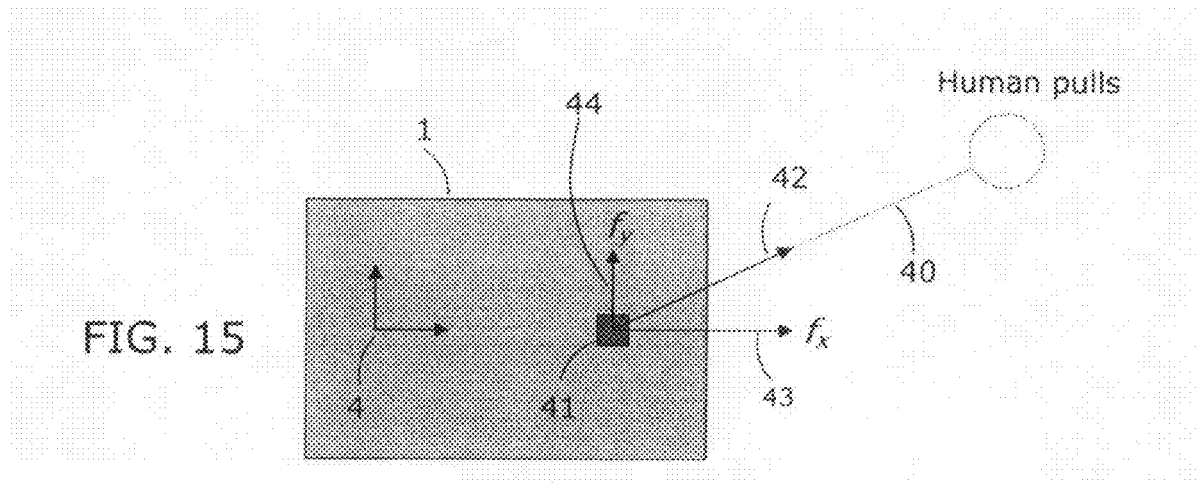
FIG. 15 illustrates a robot on which a force sensor is mounted. An elastic string 40 is used to tell the human's intention to the robot.
Figure 16:
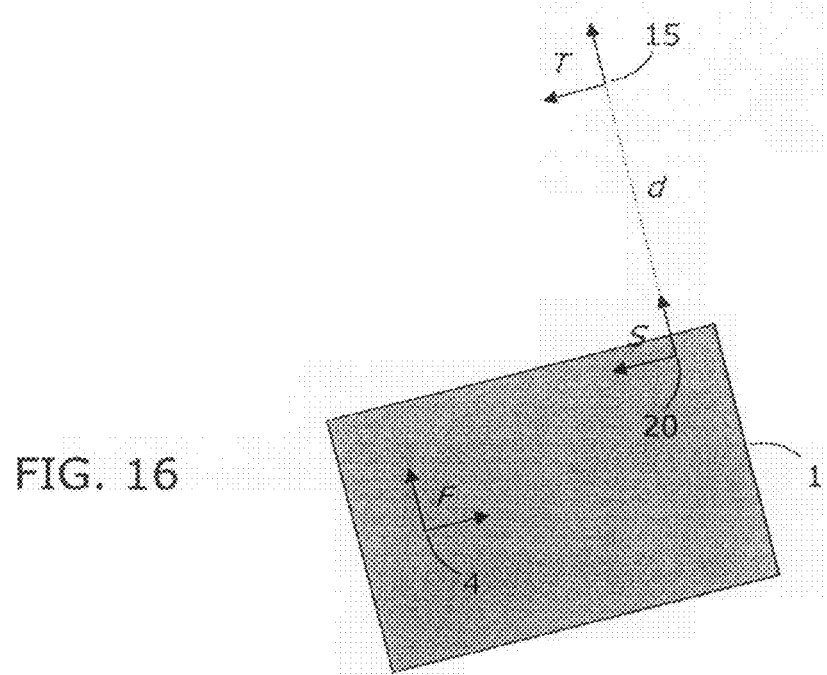
FIG. 16 is a mobile robot on which a side sonar 20 is mounted. The sonar 20 detects a target 15 at a distance d.

The best mode for carrying out the present invention is an embodiment on a wheeled 2-DOF mobile robot with sonars in front, as shown in FIG. 11A. Experiences with a prototype robot of the kind revealed that (1) sonars are inexpensive, (2) the bandwidth of the sensing data is pretty narrow, but the sonars dynamically recognize a moving human's position while the robot is also moving, (3) the human-robot team is able to construct precise maps of operation areas, (4) even children can easily negotiate with this prototype robot, and (5) the prototype robot never scares humans who guides it.

INDUSTRIAL APPLICABILITY

The present invention endows intelligence to an individual mobile robot by making it understand its specific operation area.

Therefore, the present invention can be adopted to manufacture a wide variety of mobile-robot products including the following categories: (1) entertainment robots, (2) educational robots, (3) mobile platforms for research activities, (4) vacuum-cleaning robots, floor-polishing robots, security guard robots, intelligent wheel chairs, and other service robots, (5) intelligent shopping carts and intelligent golf carts, (6) material-transfer and material-handling robots.

The invention claimed is:

1. A method of enabling a mobile robot to track a human in an operation area comprising the steps of:
   obtaining a two-variable motion command from sensors that detect the human's action; and
   executing a motion of the robot with a translation speed and a rotation speed based on the motion command, while keeping the robot's translation direction the same as the robot's body direction;
   creating a motion record that includes a translational speed and a rotation speed at each motion-control interval; and
   outputting the set of the created motion records at the end of the human-tracking motion.

2. The method of claim 1, wherein the translation speed in the executing step is restricted to non-negative.

3. The method of claim 1, wherein the translation speed in the executing step is restricted to non-positive.

4. The method of claim 1, wherein further comprising the step of reproducing the human-tracking motion using the set of the motion records.

5. The method of claim 1, wherein further comprising the step of reproducing the human-tracking motion in a reverse order using the set of the motion records.

6. A method of enabling a team of a human and a mobile robot to map an operation area comprising the steps of:
   defining a graph that is embedded in the operation area by the human;
   traversing an edge in the graph while the robot tracks the human with non-negative translation speed;
   extracting geometrical features of the both-side objects by the robot while traversing an edge in the graph;
   stopping at a vertex in the graph at the end of edge traversing;
   telling the robot the number of the vertex by the human when the team stops at a vertex;
   creating a vertex record that includes a vertex number, an anchor, a human-provided name, and a vertex position by the robot when the team stops at a new vertex;
   localizing the robot and vertices by the robot when the team stops at an existing vertex;
   creating an edge record that includes a pair of vertex numbers, a distance, geometrical features of the both-side objects by the robot when the team finishes traversing of a new edge; and
   outputting the set of the created vertex records and the set of the created edge records as a map of the operation area by the robot at the end of the mapping session.

* * * * *